(12) United States Patent
Ishida

(10) Patent No.: US 11,970,101 B2
(45) Date of Patent: Apr. 30, 2024

(54) VEHICLE EQUIPPED WITH SLOPE DEVICE

(71) Applicant: TOYOTA JIDOSHA KABUSHIKI KAISHA, Toyota (JP)

(72) Inventor: Naoya Ishida, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 401 days.

(21) Appl. No.: 17/513,170

(22) Filed: Oct. 28, 2021

(65) Prior Publication Data

US 2022/0219589 A1 Jul. 14, 2022

(30) Foreign Application Priority Data

Jan. 13, 2021 (JP) ................................ 2021-003282

(51) Int. Cl.
*B60P 1/43* (2006.01)
*A61G 3/06* (2006.01)
*E05B 83/40* (2014.01)
*E05B 85/24* (2014.01)

(52) U.S. Cl.
CPC .............. *B60P 1/431* (2013.01); *A61G 3/061* (2013.01); *A61G 3/067* (2016.11); *E05B 83/40* (2013.01); *E05B 85/245* (2013.01)

(58) Field of Classification Search
CPC ......... A61G 3/067; A61G 3/061; B60P 1/431; B60R 3/02; E05B 83/40
See application file for complete search history.

(56) References Cited

U.S. PATENT DOCUMENTS

| 571,497 | A | * | 11/1896 | Powell | B60P 1/43 |
| | | | | | 193/41 |
| 3,511,393 | A | * | 5/1970 | Abromavage | B60P 1/431 |
| | | | | | 14/71.1 |
| 4,198,187 | A | * | 4/1980 | Mountz | B60P 1/431 |
| | | | | | 14/71.1 |
| 4,941,703 | A | * | 7/1990 | Curry | B60P 1/431 |
| | | | | | 292/DIG. 43 |
| 5,046,913 | A | * | 9/1991 | Domek | B60R 5/04 |
| | | | | | 24/514 |
| 5,832,555 | A | * | 11/1998 | Saucier | B60P 1/431 |
| | | | | | 14/71.1 |
| 6,039,528 | A | * | 3/2000 | Cohn | B60P 1/4457 |
| | | | | | 414/921 |
| 6,186,733 | B1 | * | 2/2001 | Lewis | B60P 1/431 |
| | | | | | 414/921 |
| 6,203,266 | B1 | * | 3/2001 | Savaria | B60P 1/4478 |
| | | | | | 414/921 |

(Continued)

FOREIGN PATENT DOCUMENTS

| JP | 2009-018767 A | 1/2009 |
| JP | 2019-116112 A | 7/2019 |

*Primary Examiner* — Emma K Frick
(74) *Attorney, Agent, or Firm* — Dinsmore & Shohl LLP

(57) ABSTRACT

A vehicle is equipped with a body that includes a floor panel, a door that is attached to a body, a door lock mechanism that includes an outer hook and an inner hook and that is attached to a lower portion of a door to lock the door on the floor panel, and a slope device attached to a lower side of the floor panel. Tip portions of the outer hook and the inner hook penetrate the floor panel downward outside a vehicle outer end of a slope with respect to the vehicle, and restrain the slope from being deployed outward of the vehicle, when the door is locked.

2 Claims, 7 Drawing Sheets

(56) References Cited

U.S. PATENT DOCUMENTS

| | | | | |
|---|---|---|---|---|
| 6,241,452 | B1 * | 6/2001 | Eekhoff | B60P 1/43 |
| | | | | 14/71.1 |
| 6,802,095 | B1 * | 10/2004 | Whitmarsh | B60P 1/433 |
| | | | | 14/71.3 |
| 10,470,950 | B2 * | 11/2019 | Kiser | B60P 1/433 |
| 10,773,908 | B2 * | 9/2020 | Kiser | A61G 3/061 |
| 11,472,326 | B1 * | 10/2022 | Nageshkar | B60P 1/435 |
| 11,572,019 | B2 * | 2/2023 | Garceau | B60R 3/02 |
| 11,634,080 | B2 * | 4/2023 | Brion | B61D 23/025 |
| | | | | 280/166 |
| 11,673,507 | B2 * | 6/2023 | Robinson | B60R 3/02 |
| | | | | 280/164.1 |
| 2019/0193620 | A1 | 6/2019 | Matsuoka et al. | |
| 2023/0249526 | A1 * | 8/2023 | Ohtake | B62D 25/025 |

\* cited by examiner

VIEWED ALONG LINE A-A

VEHICLE EQUIPPED WITH SLOPE DEVICE

CROSS-REFERENCE TO RELATED APPLICATION

This application claims priority to Japanese Patent Application No. 2021-003282 filed on Jan. 13, 2021, incorporated herein by reference in its entirety.

BACKGROUND

1. Technical Field

The disclosure relates to the structure of a vehicle that is equipped with a slope device that deploys a slope outward of the vehicle.

2. Description of Related Art

In recent years, there has been proposed a configuration in which a slope device is mounted at a lower portion of an entrance of a shared-ride vehicle for wheelchair users to enhance the ease in getting on and off the shared-ride vehicle (e.g., see Japanese Unexamined Patent Application Publication No. 2019-116112 (JP 2019-116112 A)).

Besides, there is proposed a vehicle configured such that an auxiliary step in which a slope plate is stored is moved to a service position as a side door rotatably supported on a lateral portion of a vehicle body rotates in an opening direction and the slope plate is extracted from the auxiliary step to enable people to get on and off the vehicle through the use of a slope (e.g., see Japanese Unexamined Patent Application Publication No. 2009-18767 (JP 2009-18767 A)).

SUMMARY

By the way, the slope device is often configured such that a control unit performs rotational control of a drive motor to deploy and store the slope. In this case, the slope may be deployed due to malfunction of the control unit or the like when deployment of the slope is unnecessary.

It is thus an object of the disclosure to restrain the slope from being deployed unexpectedly.

A vehicle of the disclosure includes a body that includes a floor panel constituting a floor of a vehicle interior that is boarded by a passenger, a door that is attached to the body, a door lock mechanism that includes a hook engaging the body, and that is attached to a lower portion of the door to lock the door on the body, and a slope device that is attached to a lower side of the floor panel to deploy a slope outward of the vehicle and store the slope. A tip of the hook of the door lock mechanism penetrates the floor panel downward outside a vehicle outer end of the slope at a storage position with respect to the vehicle, and restrains the slope at the storage position from being deployed outward of the vehicle, when the door lock mechanism locks the door on the body.

In the case where the slope is stored and the door is locked, the tip of the hook of the lock mechanism mechanically restrains the slope at the storage position from being deployed. Therefore, the slope can be restrained from being deployed even in the case where a control unit of the slope device malfunctions.

In the vehicle of the disclosure, the tip of the hook may penetrate the floor panel downward, and reach an area below an upper surface of the slope at the storage position.

Thus, the tip of the hook closes up a deployment passage of the slope at the storage position. Therefore, an end portion of the slope outside the vehicle contacts the tip of the hook, so the slope is mechanically restrained from being deployed outward of the vehicle. Thus, the slope can be restrained from being deployed even in the case where the control unit of the slope device malfunctions.

In the vehicle of the disclosure, the door lock mechanism may include a striker that is engaged by the hook, and the striker may be attached to the floor panel, outside the vehicle outer end of the slope at the storage position with respect to the vehicle.

Owing to this configuration, the hook engages the striker outside the vehicle outer end of the slope with respect to the vehicle, and the tip of the hook reaches the area below the upper surface of the slope outside the vehicle outer end of the slope at the storage position with respect to the vehicle. Therefore, the slope can be restrained from being deployed even in the case where the control unit of the slope device malfunctions.

In the vehicle of the disclosure, the door lock mechanism may include a striker that is engaged by the hook, and the striker may be attached to the body below the slope, outside the vehicle outer end of the slope at the storage position with respect to the vehicle.

Owing to this configuration, the tip of the hook attached to the door engages the striker attached to the body below the slope. Therefore, the hook is connected to the door and the body above and below the slope respectively to close up the deployment passage of the slope, outside the vehicle outer end of the slope with respect to the vehicle. Thus, the strength of connection of the hook to the body increases, and hence the slope can be more reliably restrained from being deployed unexpectedly.

The disclosure can restrain the slope from being deployed unexpectedly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle 100 of one of the embodiments will be described hereinafter with reference to the drawings. Incidentally, arrows FR, UP, and RH shown in each of the drawings indicate a forward direction (a traveling direction), an upward direction, and a rightward direction of the vehicle 100 respectively. Besides, the opposite directions of the arrows FR, UP, and RH indicate a backward direction, a downward direction, and a leftward direction of the vehicle respectively. In the case where the description will be given simply by using a longitudinal direction, a lateral direction, and a vertical direction, it is assumed that the front and back in the longitudinal direction of the vehicle, the right and left in the lateral direction of the vehicle (a vehicle width direction), and the top and bottom in the vertical direction of the vehicle are meant respectively, unless otherwise specified.

Figure 1:
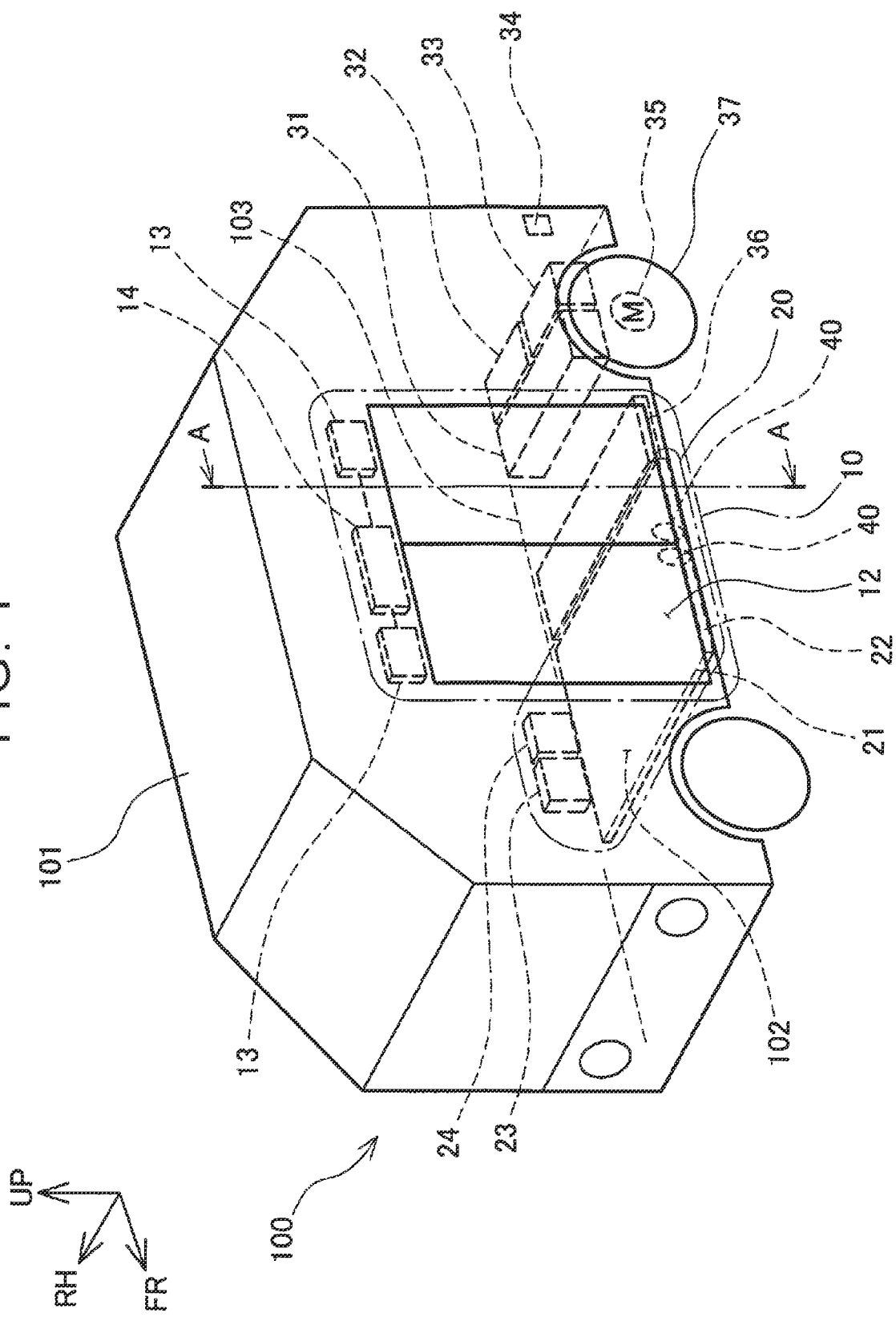
FIG. 1 is a perspective view showing a state where doors of a vehicle of one of the embodiments are closed and a slope is stored.

In the following description, the vehicle 100 will be described as an electric automobile that can autonomously run through automated driving, but is not limited thereto. As shown in FIG. 1, the vehicle 100 includes a body 101, a door device 10, a slope device 20, a vehicle control device 31, a communication device 32, a position detection device 33, a sensor 34, a drive motor 35, a battery 36, and a wheel 37. Incidentally, FIG. 1 shows a state where doors 12 of the vehicle 100 are closed and a slope 22 is stored.

The body 101 is longitudinally symmetrical, and is equipped with a vehicle interior 102 in which a passenger rides, and a floor panel 103 that constitutes a floor of the vehicle interior 102. The floor panel 103 of the vehicle interior 102 is flat, and a seat (not shown) in which the passenger is seated is arranged in the vehicle interior 102.

The door device 10 is constituted of the doors 12 as a double door that is provided on a lateral surface of the body 101 and that slides along the lateral surface of the body 101, a motor 13 that opens and closes the doors 12, and a control unit 14 that controls the operation of the motor 13. Besides, door lock mechanisms 40 that lock the doors 12 on the floor panel 103 of the body 101 are attached to lower portions of the doors 12 respectively. The control unit 14 makes a changeover between a locked state and an unlocked state of the door lock mechanisms 40.

The slope device 20 is provided on a lower side of the floor panel 103. The slope device 20 is constituted of the plate-shaped slope 22 that is deployed outward of the body 101 in the vehicle width direction, a casing 21 that stores the slope 22, a motor 23 that deploys and stores the slope 22, and a control unit 24 that controls the motor 23.

The vehicle control device 31, the communication device 32, the position detection device 33, and the sensor 34 are arranged inside the body 101. The battery 36 is arranged beside the slope device 20 below the floor panel 103. The drive motor 35 of the vehicle 100 is an in-wheel motor built inside the wheel 37. Incidentally, the drive motor 35 may be configured to be mounted on the body 101 to drive the wheel 37, instead of being configured as an in-wheel motor. The vehicle control device 31 causes the vehicle 100 to run autonomously, by performing drive control of the drive motor 35 based on a current position detected by the position detection device 33, a running state detected by the sensor 34 such as a speed sensor or an acceleration sensor, and operation information such as a destination from the communication device 32. Besides, the vehicle control device 31 causes the door device 10 and the slope device 20 to open and close the doors 12 and deploy and store the slope 22, respectively.

Figure 2:
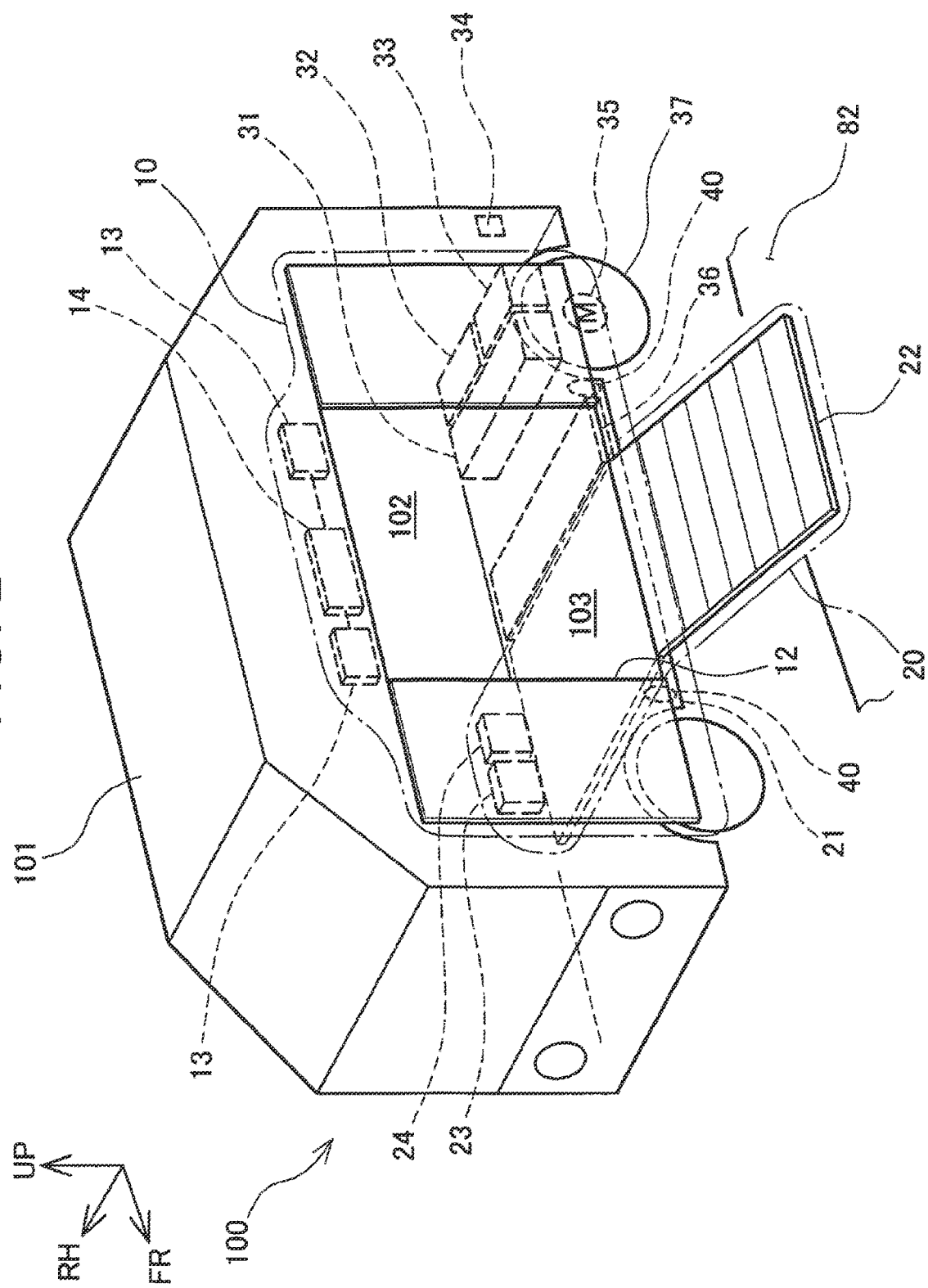
FIG. 2 is a perspective view showing a state where the doors of the vehicle shown in FIG. 1 are opened and the slope is deployed.

As shown in FIG. 2, when the vehicle 100 is stopped and the passenger gets on and off the vehicle, the door lock mechanisms 40 are rendered in the unlocked state to open the doors 12 for allowing the passenger to get on and off the vehicle. When the doors 12 are opened, the vehicle interior 102 having the flat floor comes into view. Besides, when the vehicle 100 is stopped and the doors 12 are opened, the slope device 20 deploys the slope 22 outward of the body 101 in the vehicle width direction. A tip of the deployed slope 22 is in contact with a sidewalk 82, and constitutes a passage through which the passenger on the sidewalk 82 gets on and off the floor panel 103 of the vehicle 100.

Figure 3:
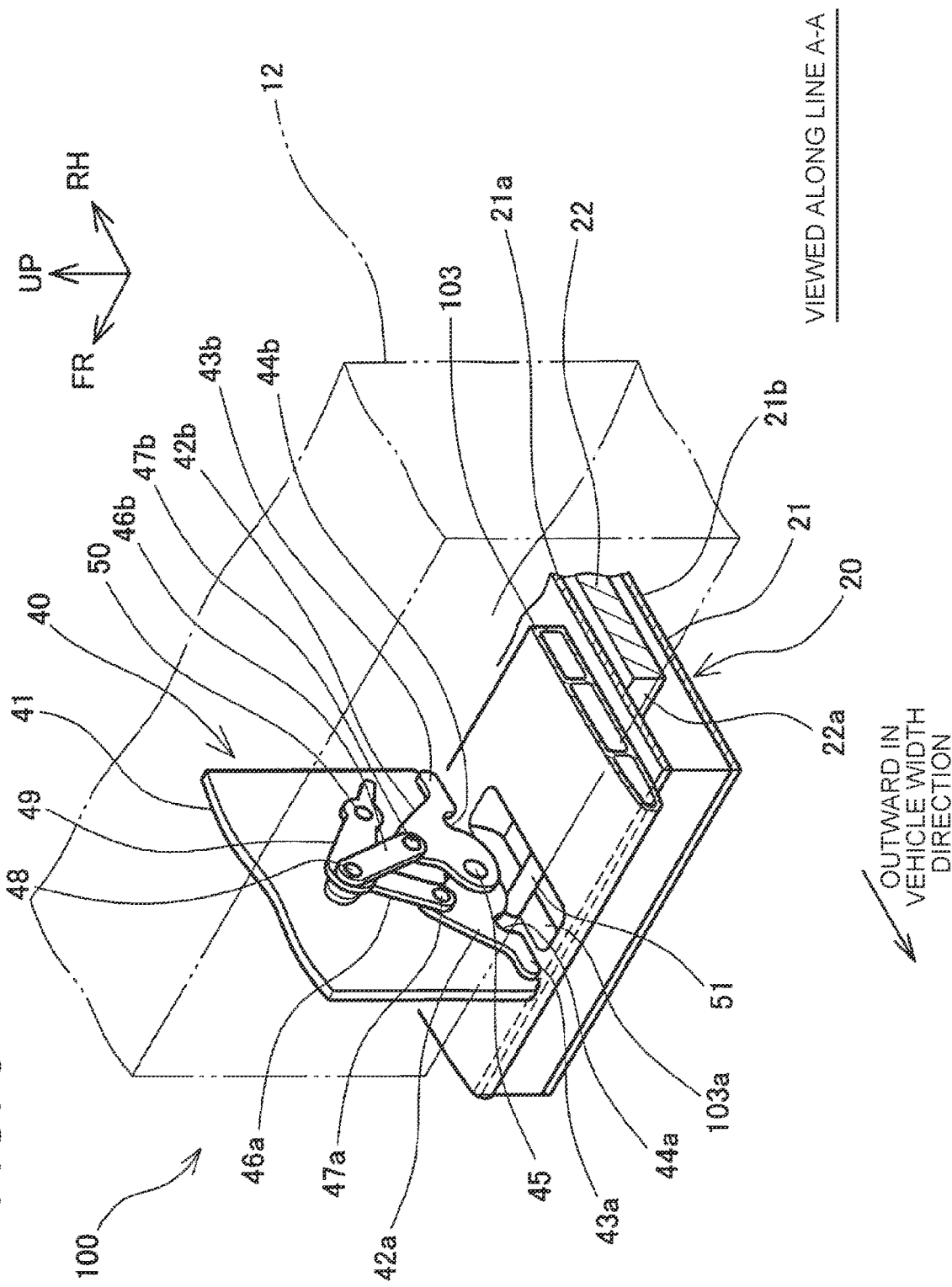
FIG. 3 is a partially cross-sectional perspective view showing a floor panel, a slope device, and a door lock mechanism of the vehicle as viewed along a line A-A shown in FIG. 1.

Next, each of the door lock mechanisms 40 attached to the lower portions of the doors 12 will be described with reference to FIGS. 3 to 5. As shown in FIG. 3, the door lock mechanism 40 is constituted of a base 41, an outer hook 42a, an inner hook 42b, an outer link 46a, an inner link 46b, an operational lever 49, and a striker 51.

Figure 4:
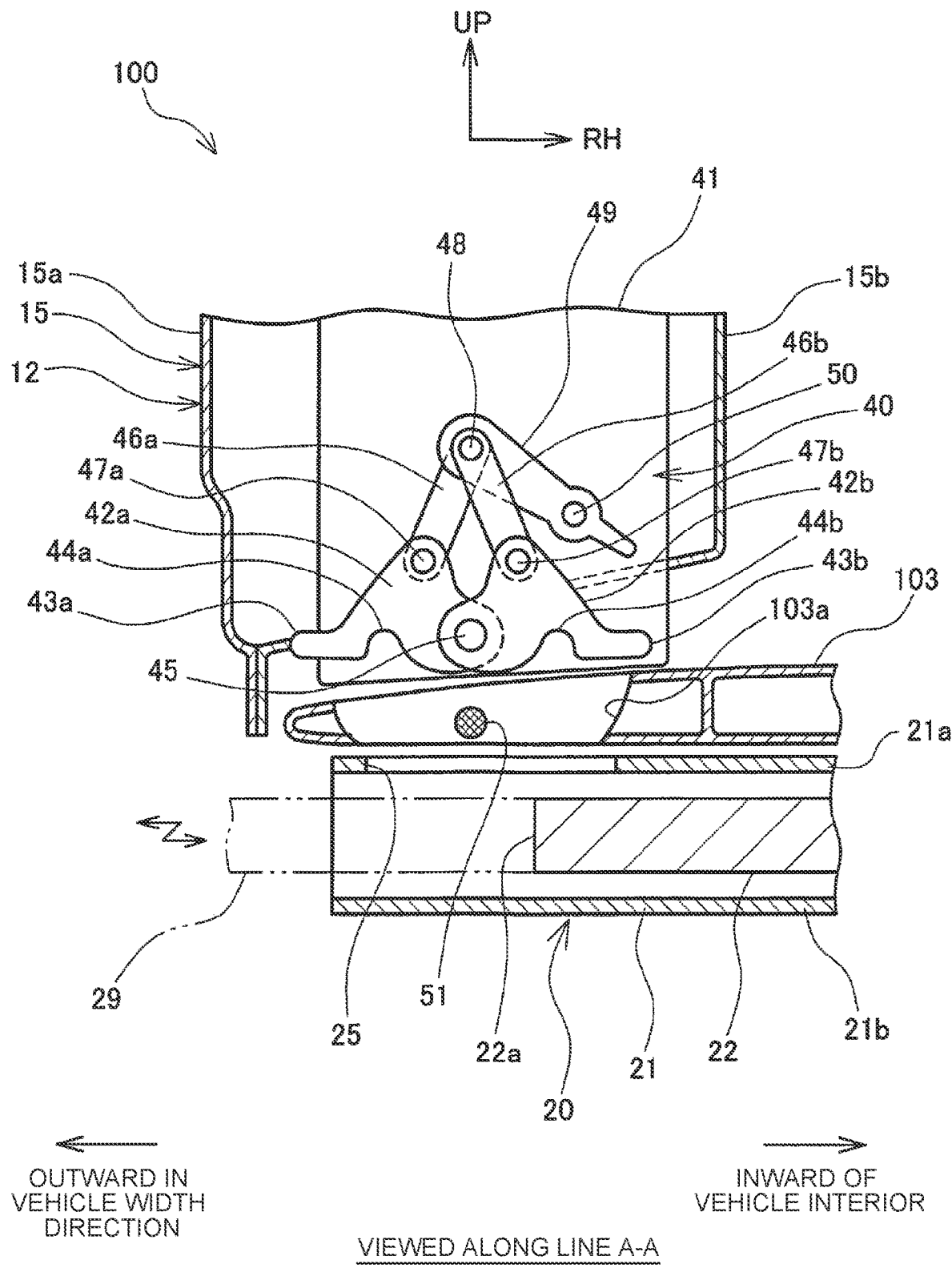
FIG. 4 is a cross-sectional view showing the floor panel, the slope device, and the door lock mechanism of the vehicle as viewed along the line A-A shown in FIG. 1, and is a view showing an unlocked state of the door lock mechanism.

As shown in FIGS. 3 and 4, the base 41 is a plate-shaped member having a surface attached to a frame 15 constituted of an outer panel 15a and an inner panel 15b of the door 12 (see FIG. 4) in such a manner as to extend in the vehicle width direction. The outer hook 42a and the inner hook 42b are rotatably attached around a lower shaft 45 attached to a lower portion of the base 41, on a plane extending in the vehicle width direction. It should be noted herein that the lower shaft 45 is attached to the base 41 in such a manner as to be located outside a vehicle-width-direction outer end 22a of the slope 22 at the storage position in the vehicle width direction. The outer hook 42a and the inner hook 42b are equipped with recess portions 44a and 44b that engage an outer periphery of the striker 51 extending in the longitudinal direction of the vehicle, and tip portions 43a and 43b extending in the opposite direction of the lower shaft 45 from the recess portions 44a and 44b, respectively.

The operational lever 49 is fixed to an upper shaft 50 attached to a position closer to the vehicle interior than the lower shaft 45 of the base 41 above the lower shaft 45. The upper shaft 50 is rotatably attached to the base 41. Besides, the upper shaft 50 is connected to a drive mechanism (not shown) to be driven rotationally. An upper connection pin 48 is attached to one end of the operational lever 49, and upper portions of the outer link 46a and the inner link 46b are rotatably attached around the upper connection pin 48. Besides, lower connection pins 47a and 47b are attached to the other side of the recess portions 44a and 44b of the outer hook 42a and the inner hook 42b respectively, and lower portions of the outer link 46a and the inner link 46b are rotatably attached around the lower connection pins 47a and 47b on a plane extending in the vehicle width direction.

As shown in FIGS. 3 and 4, an opening 103a is provided through a region of the floor panel 103 corresponding to the lower portion of the door 12. Besides, an opening 25 is also provided through an upper panel 21a of the casing 21 of the slope device 20. Besides, the slope 22 of the slope device 20 is stored.

As shown in FIG. 3, the striker 51 is attached inside the opening 103a of the floor panel 103 in such a manner as to extend in the longitudinal direction of the vehicle. Besides, as shown in FIG. 4, the striker 51 is arranged at a position outside the vehicle-width-direction outer end 22a of the slope 22 at the storage position in the vehicle width direction, as is the case with the lower shaft 45. Incidentally, in the vehicle 100 of the present embodiment, the position of the lower shaft 45 in the vehicle width direction is the same as the position of the striker 51 in the vehicle width direction. However, as long as the lower shaft 45 and the striker 51 are located outside the vehicle-width-direction outer end 22a of the slope 22 at the storage position in the vehicle width direction, the positions thereof in the vehicle width direction may be different from each other.

Figure 5:
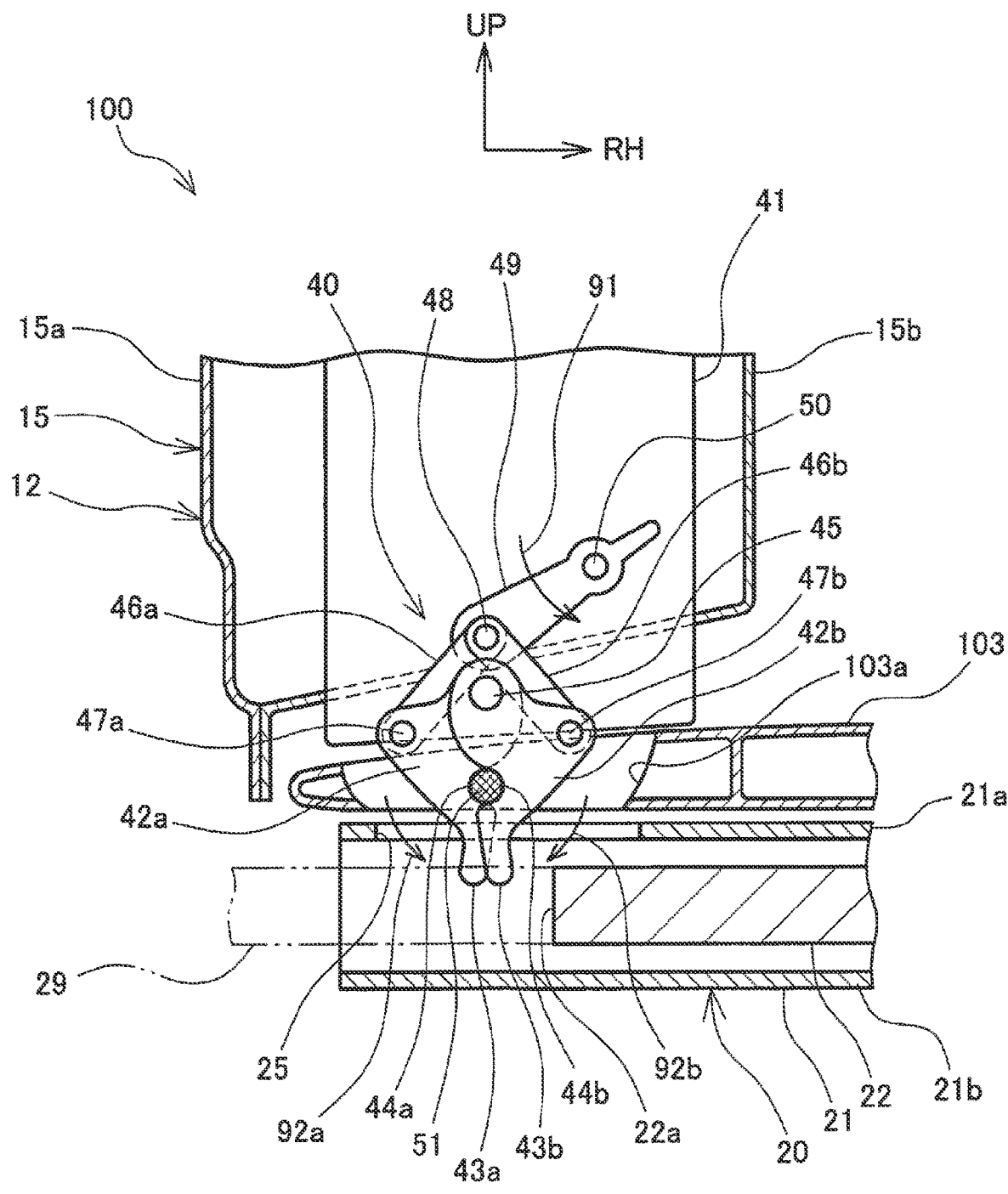
FIG. 5 is a cross-sectional view showing a locked state of the door lock mechanism shown in FIG. 4.

As shown in FIG. 5, when the upper shaft 50 is rotated counterclockwise as indicated by an arrow 91 by a drive mechanism (not shown), the operational lever 49 rotates counterclockwise as indicated by the arrow 91. The operational lever 49 then moves the upper connection pin 48 downward, and the upper connection pin 48 moves the upper portions of the outer link 46a and the inner link 46b downward, and moves the lower portions of the outer link 46a and the inner link 46b outward in the vehicle width direction and inward of the vehicle interior respectively. Thus, the lower connection pins 47a and 47b also move outward in the vehicle width direction and inward of the vehicle interior respectively. Therefore, the outer hook 42a rotates counterclockwise around the lower shaft 45 as indicated by an arrow 92a, and the recess portion 44a engages an outer side of the striker 51 in the vehicle width direction. Besides, the inner hook 42b rotates clockwise around the lower shaft 45 as indicated by an arrow 92b, and the recess portion 44b engages an inner side of the striker 51 with respect to the vehicle interior.

Besides, when the outer hook 42a rotates counterclockwise as indicated by the arrow 92a, the tip portion 43a protrudes below the upper panel 21a through the opening 103a provided through the floor panel 103 and the opening 25 provided through the upper panel 21a of the casing 21 of the slope device 20. By the same token, when the inner hook 42b rotates clockwise as indicated by the arrow 92b, the tip portion 43b protrudes below the upper panel 21a through the opening 103a and the opening 25. In this manner, the tip portions 43a and 43b of the outer hook 42a and the inner hook 42b penetrate the floor panel 103 downward through the openings 103a and 25, and reach an area below an upper surface of the slope 22 at the storage position.

As shown in FIG. 5, the slope device 20 stores the slope 22. The striker 51 is arranged at such a position that the tip portion 43b does not interfere with the slope 22 when the inner hook 42b rotates as indicated by the arrow 92b, outside the vehicle-width-direction outer end 22a of the slope 22 at the storage position in the vehicle width direction. Accordingly, the tip portions 43a and 43b of the outer hook 42a and the inner hook 42b penetrate the floor panel 103 downward outside the vehicle-width-direction outer end 22a of the slope 22 at the storage position in the vehicle width direction, and reach the area below the upper surface of the slope 22. Therefore, the tip portions 43a and 43b close up part of the passage 29 for deploying the slope 22 outward in the vehicle width direction, and restrain the slope 22 from being deployed outward in the vehicle width direction.

Besides, the recess portions 44a and 44b of the outer hook 42a and the inner hook 42b of each of the door lock mechanisms 40 engage the striker 51 of the floor panel 103, and enter the opening 103a of the floor panel 103 to engage the floor panel 103. Thus, the door lock mechanisms 40 lock the doors 12 on the body 101 to prevent the doors 12 from being opened in the longitudinal direction of the vehicle.

As described above, in the case where the slope 22 is stored and the doors 12 are locked, the tip portions 43a and 43b of the outer hook 42a and the inner hook 42b of each of the door lock mechanisms 40 close up part of the deployment passage 29 of the slope 22 at the storage position. Thus, the vehicle-width-direction outer end 22a of the slope 22 is in contact with the tip portions 43a and 43b, so the slope 22 is restrained from being deployed outward in the vehicle width direction. In this manner, the tip portions 43a and 43b mechanically restrain the slope 22 at the storage position from being deployed, and the slope 22 can be restrained from being deployed even in the case where the control unit 24 of the slope device 20 malfunctions.

In the foregoing description, the base 41 is a plate-shaped member attached to the frame 15 of each of the doors 12 in such a manner that the surface of the base 41 extends in the vehicle width direction, the outer hook 42a, the inner hook 42b, the outer link 46a, the inner link 46b, and the operational lever 49 can rotate on the plane extending in the vehicle width direction, and the striker 51 is attached to the floor panel 103 in such a manner as to extend in the longitudinal direction of the vehicle, but the disclosure is not limited thereto. For example, it is also possible to adopt a configuration in which the base 41 is attached to the frame 15 in such a manner that the surface of the base 41 extends in the longitudinal direction of the vehicle, the outer hook 42a, the inner hook 42b, the outer link 46a, the inner link 46b, and the operational lever 49 can rotate on the plane extending in the longitudinal direction of the vehicle, and the striker 51 is attached to the floor panel 103 in such a manner as to extend in the vehicle width direction. In the case of this configuration, it is appropriate to locate rotating surfaces of the outer hook 42a and the inner hook 42b outside the vehicle-width-direction outer end 22a of the slope 22 at the storage position in the vehicle width direction, and to ensure that the tip portions 43a and 43b penetrate below the upper surface of the slope 22 at the position of the vehicle-width-direction outer end 22a of the slope 22 when the outer hook 42a and the inner hook 42b come into contact with the striker 51.

Next, another door lock mechanism 140 mounted in a vehicle 110 of another one of the embodiments will be described with reference to FIGS. 6 and 7. Components identical to those of the vehicle 100 and the door lock mechanisms 40 described hereinabove with reference to FIGS. 1 to 5 are denoted by the same reference symbols respectively, and the description thereof will be omitted.

In the vehicle 110 of the embodiment, the floor panel 103 is provided with an opening 103b that is larger than the opening 103a provided through the floor panel 103 of the vehicle 100 of FIG. 5. Besides, an opening 25a that is larger than the opening 25 provided through the upper panel 21a of the slope device 20 of the vehicle 100 of FIG. 5 is provided through the upper panel 21a of the slope device 20, and an opening 26 is provided through a lower panel 21b. In the stored state, the slope 22 is stored such that a tip portion 143 does not interfere with the slope 22 when a hook 142 rotates as indicated by an arrow 94 as shown in FIG. 7, as will be described later. Besides, the body 101 is equipped with a cross member 104 that is arranged below the slope device 20 and that extends in the vehicle width direction.

Figure 6:
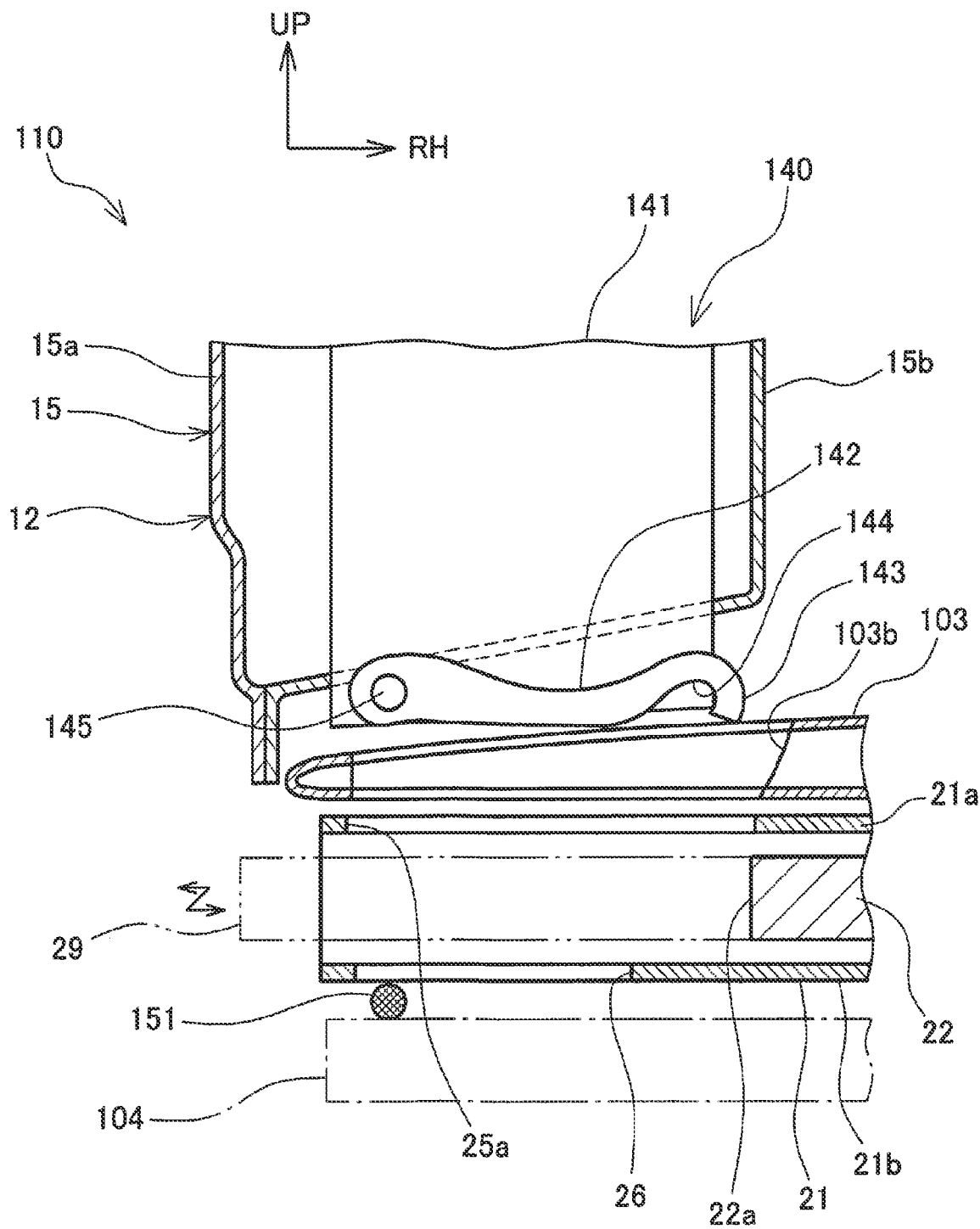
FIG. 6 is a cross-sectional view showing a door lock mechanism, a floor panel, and a slope device of a vehicle according to another one of the embodiments, and is a cross-sectional view showing an unlocked state of the door lock mechanism.

As shown in FIG. 6, the door lock mechanism 140 of the embodiment is constituted of a base 141, the hook 142, a shaft 145, and a striker 151. The base 141 is attached to the frame 15 of each of the doors 12 in such a manner that the surface of the base 141 extends in the vehicle width direction. The shaft 145 is attached to a lower portion of the base 141, and the striker 151 is attached to the cross member 104 of the body 101 of the vehicle 110 in such a manner as to extend in the longitudinal direction of the vehicle, so as to be located outside the vehicle-width-direction outer end 22a of the slope 22 at the storage position in the vehicle width direction, below the slope device 20. One end of the hook 142 is fixed to the shaft 145. The shaft 145 is rotatably attached to the base 141. Besides, the shaft 145 is connected to a drive mechanism (not shown) and is driven rotationally. A recess portion 144 that engages an outer periphery of the striker 151 is provided at the other end of the hook 142. The hook 142 is longer than the inner hook 42b from the shaft 145 to the recess portion 144, since the hook 142 is longer than the inner hook 42b of each of the door lock mechanisms 40 between the shaft 145 and the striker 151. Besides, the tip portion 143 is different from the inner hook 42b in that the tip portion 143 does not protrude from the recess portion 144 in the opposite direction of the shaft 145.

Figure 7:
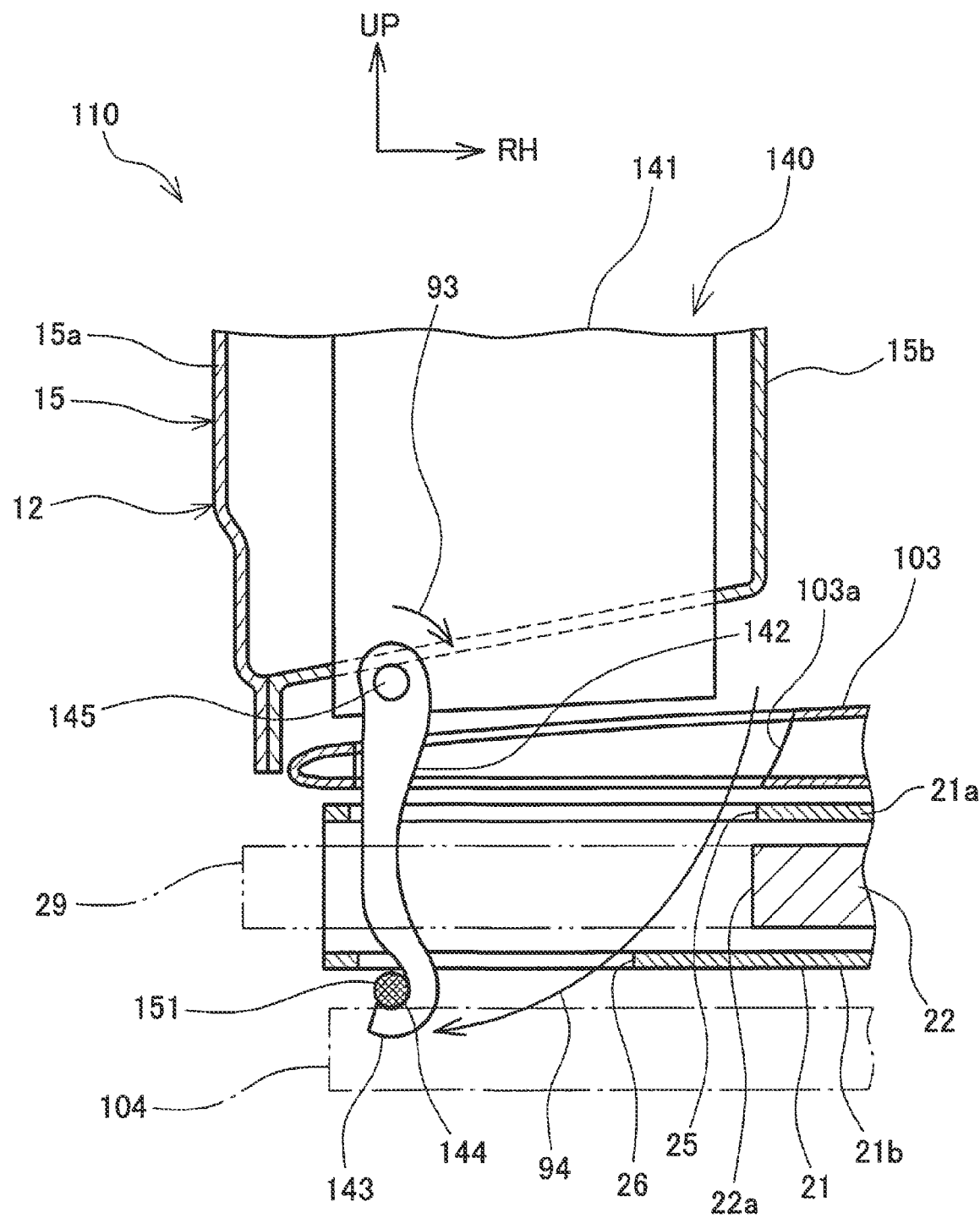
FIG. 7 is a cross-sectional view showing a locked state of the door lock mechanism of the embodiment shown in FIG. 6.

As shown in FIG. 7, when the shaft 145 is rotated clockwise as indicated by an arrow 93 by a drive device (not shown), the hook 142 rotates clockwise as indicated by the arrow 94, and the recess portion 144 and the tip portion 143 protrude downward of the lower panel 21b through the opening 103a provided through the floor panel 103, the opening 25 provided through the upper panel 21a of the casing 21 of the slope device 20, and the opening 26 provided through the lower panel 21b. The recess portion 144 then engages a vehicle interior side of the striker 151 arranged below the lower panel 21b.

The striker 151 is located outside the vehicle-width-direction outer end 22a of the slope 22 at the storage position in the vehicle width direction. Therefore, the recess portion 144 at the tip of the hook 142 engages the striker 151 outside the vehicle-width-direction outer end 22a in the vehicle width direction, below the slope 22. Therefore, the hook 142 is connected to each of the doors 12 and the cross member 104 of the body 101 outside the vehicle-width-direction outer end 22a of the slope 22 above and below the slope 22 in the vehicle width direction, and closes up the deployment passage 29 of the slope 22. Thus, the strength of the hook 142 in a sliding direction is increased. When the slope 22 is about to be deployed outward in the vehicle width direction, the vehicle-width-direction outer end 22a comes into contact with the hook 142 to restrain the slope 22 from being deployed outward in the vehicle width direction. Accordingly, the slope 22 can be effectively restrained from being deployed even in the case where the control unit 24 of the slope device 20 malfunctions.

Besides, the door lock mechanism 140 is constituted of the single hook 142, the single striker 151, and the single shaft 145, and is simpler in configuration than each of the door lock mechanisms 40. It is therefore possible to effectively restrain the slope 22 from being deployed with a simple configuration.

In the foregoing description, the door lock mechanism 140 is described as being constituted of the single hook 142, the single striker 151, and the single shaft 145. However, as is the case with the door lock mechanisms 40, the door lock mechanism 140 may be constituted of an inner hook, an outer hook, an outer link, an inner link, and an operational lever, and may be configured such that a recess portion of the outer hook and a recess portion of the inner hook engage the outer side of the striker 151 in the vehicle width direction and the inner side of the striker 151 with respect to the vehicle interior respectively.

Besides, the striker 151 may be attached to a structural member of the body 101 in such a manner as to extend in the vehicle width direction, the base 141 may be attached to the frame 15 of each of the doors 12 such that the surface of the base 141 extends in the longitudinal direction of the vehicle, and the hook 142 may be configured to be rotatable on a plane extending in the longitudinal direction of the vehicle. In this case, it is appropriate to adopt a configuration in which a rotating surface of the hook 142 is located outside the vehicle-width-direction outer end 22a of the slope 22 at the storage position in the vehicle width direction, and the tip portion 143 is located outside the vehicle-width-direction outer end 22a of the slope 22 in the vehicle width direction when the hook 142 engages the striker 151.

Besides, the striker 151 has been described as being attached to the cross member 104 of the body 101. However, as long as the striker 151 is structurally connected to the body 101, the striker 151 may not be directly attached to the body 101. For example, the striker 151 may be configured to be attached to the lower panel 21b of the slope device 20 attached to the body 101.

In the foregoing description, the doors 12 of the vehicle 100 or 110 have been described as being a pair of double sliding doors provided on the lateral surface of the body 101, but the disclosure is not limited thereto. The doors 12 may be a pair of rotary opening/closing doors attached to the lateral surface of the body 101.

Besides, the doors 12 may be arranged in front of or behind the vehicle 100 or 110, and the slope device 20 may be configured to deploy the slope 22 outward of the vehicle in the longitudinal direction of the vehicle.

What is claimed is:

1. A vehicle comprising:
a body that includes a floor panel constituting a floor of a vehicle interior that is boarded by a passenger;
a door that is attached to the body;
a door lock mechanism that includes a hook engaging the body, and that is attached to a lower portion of the door to lock the door on the body; and
a slope device that is attached to a lower side of the floor panel to deploy a slope outward of the vehicle and store the slope, wherein
a tip of the hook of the door lock mechanism penetrates the floor panel downward outside a vehicle outer end of the slope at a storage position with respect to the vehicle, and restrains the slope at the storage position from being deployed outward of the vehicle, when the door lock mechanism locks the door on the body,
the door lock mechanism includes a striker that is engaged by the hook, and
the striker is attached to the body below the slope, outside the vehicle outer end of the slope at the storage position with respect to the vehicle.

2. The vehicle according to claim 1, wherein
the tip of the hook penetrates the floor panel downward, and reaches an area below an upper surface of the slope at the storage position.

* * * * *